United States Patent [19]

Netterstedt et al.

[11] 3,916,955
[45] Nov. 4, 1975

[54] TIGHTENING LAYER ON INSULATED PIPE LINES

[75] Inventors: Sture Netterstedt; Bengt Lindstrand, both of Fagersta, Sweden

[73] Assignee: Fagersta AB, Fagersta, Sweden

[22] Filed: May 6, 1974

[21] Appl. No.: 467,478

[30] Foreign Application Priority Data
May 11, 1973 Sweden.............................. 7306668

[52] U.S. Cl. ................. 138/155; 138/28; 138/151; 138/157; 138/163; 138/171
[51] Int. Cl.[2]...... F16L 9/00; F16L 9/14; F16L 9/22
[58] Field of Search............. 138/28, 100, 147, 151, 138/155, 157, 163, 170, 171, 177, DIG. 11

[56] References Cited
UNITED STATES PATENTS

| 90,322 | 5/1869 | Vanstone............................ | 138/171 |
| 1,840,305 | 1/1932 | Andrus et al. ...................... | 138/151 |
| 3,800,834 | 4/1974 | Terry................................. | 138/151 |

FOREIGN PATENTS OR APPLICATIONS

| 601,538 | 8/1934 | Germany........................... | 138/157 |
| 16,712 | 7/1895 | United Kingdom................... | 138/28 |
| 1,054,065 | 10/1953 | France.............................. | 138/147 |

Primary Examiner—Richard E. Aegerter
Assistant Examiner—Richard R. Stearns
Attorney, Agent, or Firm—Larson, Taylor and Hinds

[57] ABSTRACT

The invention relates to an expansion absorbing tightening layer for insulated pipe lines, which layer is applied outside the insulation of a pipe line. In accordance with the invention, the layer consists of steel plates, the longitudinal edges of which are welded together by means of longitudinal seam welds. The end edges of the plates are welded together by means of transverse seam welds. The welds are made in outwards folded flanges in such a manner that the joints of the plates are resiliently flexible in a direction transverse of the joints of the plates. When the layer in the longitudinal direction of the pipe line consists of sections, each section consists of two equal semicylindrical shells. The longitudinal folded flanges of successive sections may be shifted in such a manner that they do not abut upon each other.

6 Claims, 4 Drawing Figures

TIGHTENING LAYER ON INSULATED PIPE LINES

The present invention refers to a tightening layer on insulated pipe lines, which layer is applied outside the insulation of the pipe line.

Pipe lines for the transport of gaseous or liquid fluids, in the latter case for example natural gases cooled down to liquid state, must be insulated against the surroundings i.e. against heat and injury of various kinds. Liquid gas has a very low temperature, according to a known example −163°C, whereas it can be necessary to heat up heavy oil to a temperature higher than the surroundings in order to get it in a state where it can be transported in pipe lines. In both cases an insulation is necessary which prevents heat transfer and known such insulations can be made from mineral wool, cellular plastic or polyurethane.

Outside the insulation some kind of protective layer must be arranged against the influence of e.g. weather. Known such protective layers often consist of a plastic strip or the like which is wound around the insulation. Also protective layers in the form of plates bolted together, usually aluminum plates, are to be found, wherein the joints are made as conventional lap joints.

The drawback of these known protective layers is their lack of tightness. They are thus never completely tight, either against gases or liquids. Even if a well made protective layer from a plastic strip has a good tightness when it is new its resistance against mechanical injury is rather poor as is well known, and therefore injuries causing untightness in the tightening layer occurs easily.

The object of the present invention is to achieve a tightening layer for insulated pipe line, for example pipe lines on ships which are used for transport of liquid gas, wherein this tightening layer shall be more resistant against attacks from surrounding aggressive conditions than has been the case with hitherto known tightening layers. The tightening layer according to the invention is characterized in that it consists of steel plates, especially plates of stainless steel, the longitudinal edges of which are welded together by means of longitudinal seam welds and the end edges of which are welded together by means of transverse seam welds, wherein the welds are made in outwards folded flanges.

Several essential advantages are provided by the invention. In the first place a completely tight protective layer around a pipe line is achieved in this manner. Not only does it imply a protection against precipitation, sprinkling of water and the like, but also it gives a possibility of a complete control of the atmosphere between the tightening layer and the pipe line, i.e. in the insulation. It is then e.g. possible to demoisten this atmosphere in order to reduce the risk of corrosion attacks on the pipe line. It is also possible to install means for a rapid detection of leakage, which is of great importance in delicate surroundings. A reliable protection is moreover attained against attack on the insulation from plants and animals which especially in tropical climate can cause troublesome injuries.

The folded flanges in which the weld joints are situated impart to the tightening layer a certain elasticity and permits thereby changes in length due to temperature changes. They also impart to the tightening layer an increased rigidity and thereby a higher resistance against mechanical injury.

The tightening layer is preferably made of stainless steel sheetings which impart to it a substantially improved resistance against exterior injury in comparison with existing protective layers. The stainless material in itself has a high yield point strength which is further raised at cold working. It has moreover a high corrosion resistance which is of a great value on ships where the atmosphere is very salt-bearing.

The invention will be described in detail in the following specification with references to the accompanying drawings on which an embodiment of the invention is schematically illustrated as an example.

FIG. 1 on the drawings is a perspective view of a part of a pipe line which is provided with an insulation and a tightening layer according to the invention.

Figure 1:
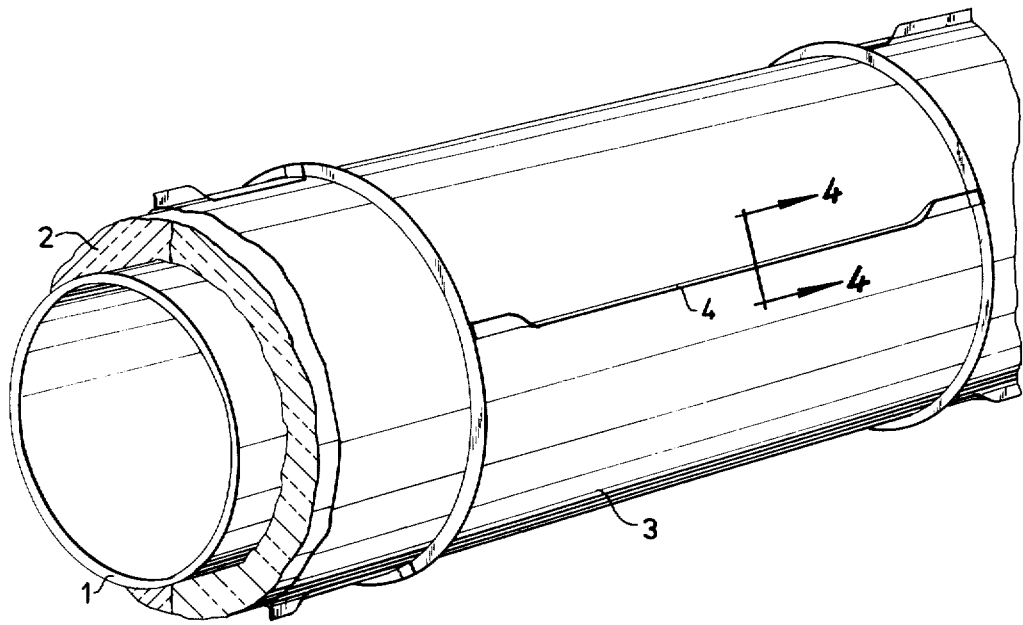
Figure 2:
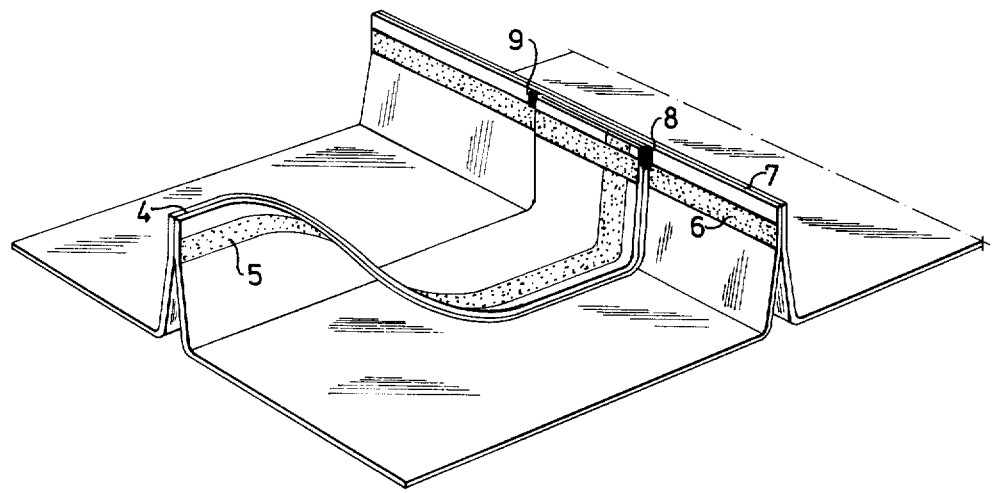
FIG. 2 illustrates in enlarged perspective a detail view of the connection between transverse and a longitudinal folded flange joints and FIG. 3 in the same manner as FIG. 2 shows the connection between transverse and longitudinal folded flange joints in which the connection is performed in another manner.

The pipe line according to FIG. 1 comprises an inner tube 1, an insulation 2 and a seam welded tightening layer 3. The inner tube or pipe line 1 can for example be filled with a liquid natural gas which may have a temperature of −163°C. The inner tube must consist of a material that resists this low temperature, e.g. a steel having a very good impact strength. Also other materials are conceivable, for example certain plastics. Insulation 2 consists preferably of mineral wool, cellular plastic or polyurethane. Tightening layer 3 preferably comprises sections formed of identical semicylindrical tubular shells. The longitudinal edges 4 of the shells are folded upwards to flanges which are in the main radially directed with respect to the axis of pipe line 1. The standing flanges 4 are welded together by means of seam welds 4 in a manner which is more clear from FIG. 2. The ends of the tubular shells are performed with folded flanges in a similar manner as flanges 4, and welded together with adjoining tubular shells by means of weld seams 6.

In the embodiment according to FIG. 1 adjacent sections of the tightening layer are changed or turned in such a manner to each other that the longitudinal folded flanges of adjacent sections do not abut upon each other. According to this particular embodiment the turning or shifting is 90°. As is clear from FIG. 2 the longitudinal folded flange joint 4 is folded down against the layer within a range at its connection to the transverse folded flange joint 7. It is clear from FIG. 2 how the connection is performed as to the rest, which illustrates such a so called T-joint. Two spot welds 8 and 9 are applied in those points where the joint changes into a joint comprising four layers of plate.

Figure 3:
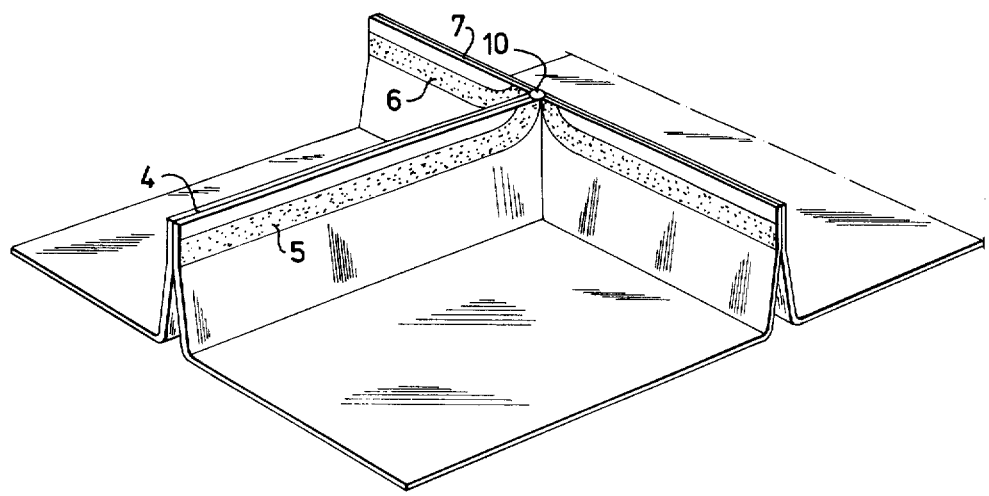

As an alternative to a T-joint for the joining of a longitudinal folded flange joint to a transverse folded flange a dot joint according to FIG. 3 can be used at which the longitudinal flange joint is not folded down. In this case the point of intersection between the folded flange joints accordingly remains unwelded, and therefore a separate joining must be performed at this point for example by means of spot welding, brazing or by any other suitable means.

Figure 4:
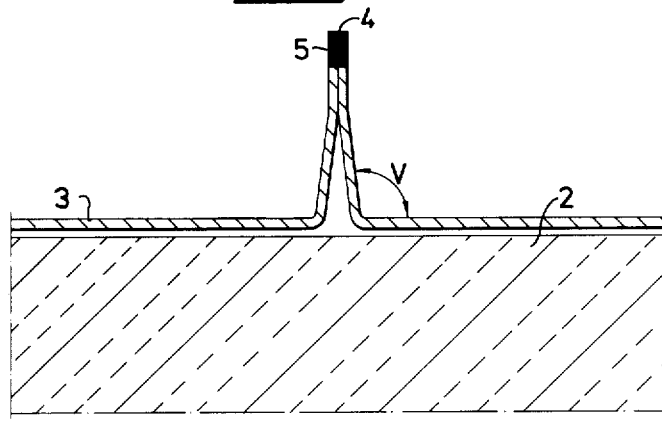
FIG. 4 illustrates in enlarged scale a cross section through a folded flange, taken along line 4—4 of FIG. 1.

FIG. 4 illustrates on an enlarged scale in comparison with the other figures how the folded flanges are welded together. Each flange has been made by folding the plate so that the angle v between the principal part of the plate and the folded up rim is somewhat more than 90°. Thereby the joints of the plates have become resiliently flexible and changes in length of the tightening layer, for example due to heat, are absorbed by the joints.

The invention is not restricted to the special embodiment as described above and illustrated on the drawings but comprises all those embodiments which fall within the scope of the patent claims.

We claim:

1. An expansion absorbing tightening layer for insulated pipe lines, comprising:
    a plurality of longitudinally extending sections attached end to end, each longitudinally extending section being made up of one or more steel plates, which, taken together, surround the insulation of the pipe, each section including at least one longitudinally extending joint formed by a pair of opposed longitudinally extending steel plate edges and transversely extending end joints formed by facing end edges of adjacent sections for connecting each section to its adjacent sections,
    each of said longitudinal and end joints comprising a flange formed along each edge of the joint and turned radially outwardly at said edge, said outwardly turned flanges at each joint being welded together at a radial outward portion thereof, the radial inward ends of the flanges at each joint being normally spaced apart from each other, the spacing between the inner ends of the flanges and the spacing of the weld outward from the inner ends of the flanges being selected such that the plates are resiliently movable towards and away from each other to reduce and expand the space between the radial inner ends of the flanges to compensate for changing temperature conditions.

2. An expansion absorbing tightening layer according to claim 1, each of said sections comprising a plurality of said steel plates, each connected together by said longitudinally extending joints.

3. An expansion absorbing tightening layer according to claim 2, wherein each section comprises two identical semi-cylindrical shells welded together at a pair of said longitudinally extending joints.

4. An expansion absorbing tightening layer according to claim 1, wherein, in the longitudinal direction of the pipe line, the longitudinal joints of successive sections are shifted transversely relative to each other such that they do not abut each other.

5. An expansion absorbing tightening layer according to claim 1, wherein at its longitudinal ends, the flanges forming at least one longitudinal joint are folded down onto the surface of the layer and folded against the adjacent transverse end joints where the longitudinal joint and the end joints meet.

6. An expansion absorbing tightening layer according to claim 1, wherein the flanges are turned radially outwardly so as to form an angle of slightly greater than 90° with the remainder of its respective steel plate immediately adjacent that flange.

* * * * *